US009243441B2

(12) United States Patent
Gupta et al.

(10) Patent No.: US 9,243,441 B2
(45) Date of Patent: Jan. 26, 2016

(54) SYSTEM FOR REMOTELY REQUESTING ACTIVATION OF A VEHICLE FUNCTION

(71) Applicant: Nissan North America, Inc., Franklin, TN (US)

(72) Inventors: Balkishan Malay Gupta, Novi, MI (US); Wade May, Farmington Hills, MI (US); Jerome Buckingham, Canton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 107 days.

(21) Appl. No.: 14/193,366

(22) Filed: Feb. 28, 2014

(65) Prior Publication Data

US 2015/0247353 A1 Sep. 3, 2015

(51) Int. Cl.

*B60R 25/01* (2013.01)
*E05F 15/77* (2015.01)
*G06F 21/31* (2013.01)

(52) U.S. Cl.

CPC ............. *E05F 15/77* (2015.01); *E05Y 2900/50* (2013.01)

(58) Field of Classification Search

CPC ........ B60R 25/01; G06F 21/31; G07C 7/008; G07C 9/00174
USPC ........................................................ 701/2, 36
See application file for complete search history.

(56) References Cited

U.S. PATENT DOCUMENTS

| | | | | |
|---|---|---|---|---|
| 5,929,769 | A | 7/1999 | Garnault | |
| 6,496,107 | B1 | 12/2002 | Himmelstein | |
| 6,856,239 | B1 | 2/2005 | Hicks | |
| 7,057,307 | B2 | 6/2006 | Yokomori | |
| 7,688,179 | B2 | 3/2010 | Kurpinski et al. | |
| 8,091,280 | B2 | 1/2012 | Hanzel et al. | |
| 8,441,366 | B2 | 5/2013 | Buss | |
| 8,571,725 | B2 * | 10/2013 | Juzswik | 701/2 |
| 2011/0118946 | A1 | 5/2011 | Reimann et al. | |
| 2011/0276234 | A1 | 11/2011 | Van Gastel | |
| 2011/0313619 | A1 | 12/2011 | Washeleski et al. | |
| 2012/0158214 | A1 * | 6/2012 | Talty et al. | 701/2 |
| 2012/0267442 | A1 | 10/2012 | Choi et al. | |
| 2013/0151084 | A1 | 6/2013 | Lee | |
| 2013/0332007 | A1 * | 12/2013 | Louboutin | 701/2 |

* cited by examiner

*Primary Examiner* — Tan Q Nguyen
(74) *Attorney, Agent, or Firm* — Young, Basile, Hanlon & MacFarlane, P.C.

(57) ABSTRACT

A system for activating a vehicle function includes a vehicle and at least one remote controller. The least one remote controller is configured to receive, prior to a user approaching their vehicle, a request from the user to have a vehicle function activated when the user approaches their vehicle, and to periodically transmit request signals indicating the request. The vehicle defines a first communication range with the at least one remote controller for communication of the request signals. The vehicle is vehicle configured to receive at least one of the request signals upon the at least one remote controller's entry into the first communication range, and generate an instruction to activate the vehicle function in accordance with the request.

19 Claims, 5 Drawing Sheets

SYSTEM FOR REMOTELY REQUESTING ACTIVATION OF A VEHICLE FUNCTION

TECHNICAL FIELD

The embodiments disclosed herein generally relate to systems for remotely requesting the activating of a vehicle function.

BACKGROUND

Passenger vehicles are commonly configured to automatically perform a variety of functions at the request of a user. A vehicle including a closure panel powered for automatic movement, such as a backdoor or a side door, for example, may include an interface requiring the user to manually actuate a user input device, such as a remote controller or a request switch on the vehicle, or to make a gesture, such as a kick, toward the vehicle.

SUMMARY

Disclosed herein are embodiments of systems for activating a vehicle function.

In one aspect, a system for activating a vehicle function includes a vehicle and at least one remote controller. The least one remote controller is configured to receive, prior to a user approaching their vehicle, a request from the user to have a vehicle function activated when the user approaches their vehicle, and to periodically transmit request signals indicating the request. The vehicle defines a first communication range with the at least one remote controller for communication of the request signals. The vehicle is vehicle configured to receive at least one of the request signals upon the at least one remote controller's entry into the first communication range, and generate an instruction to activate the vehicle function in accordance with the request.

In another aspect, a vehicle includes a receiver that defines a first communication range and a second communication range with a remote controller, with the first communication range being larger than the second communication range. The vehicle further includes a system for activating a vehicle function. The system is configured to receive one or more vehicle function activation request signals from the remote controller over the first communication range while the remote controller is outside of the second communication range, enter a welcome state for the remote controller, exchange one or more detection signals with the remote controller over the second communication range, and generate an instruction to activate the vehicle function based on the receipt of the one or more vehicle function activation request signals and the exchange of the one or more detection signals.

These and other aspects will be described in additional detail below.

BRIEF DESCRIPTION OF THE DRAWINGS

The various features, advantages and other uses of the present systems and methods will become more apparent by referring to the following detailed description and drawings in which.

DETAILED DESCRIPTION

A system according to the description that follows can include a vehicle and a remote controller. The remote controller is equipped to receive a user's request to activate a vehicle function. The request can be entered when the user is at a remote location outside of a communication range between the remote controller and the vehicle. The remote controller will periodically transmit signals indicating the user's request, and eventually, when the user approaches the vehicle and enters the communication range, the vehicle will receive one or more of the signals and activate the vehicle function. The system is described primarily with reference to the automatic movement of a power backdoor, but could be implemented with respect to many other vehicle functions.

Figure 1:
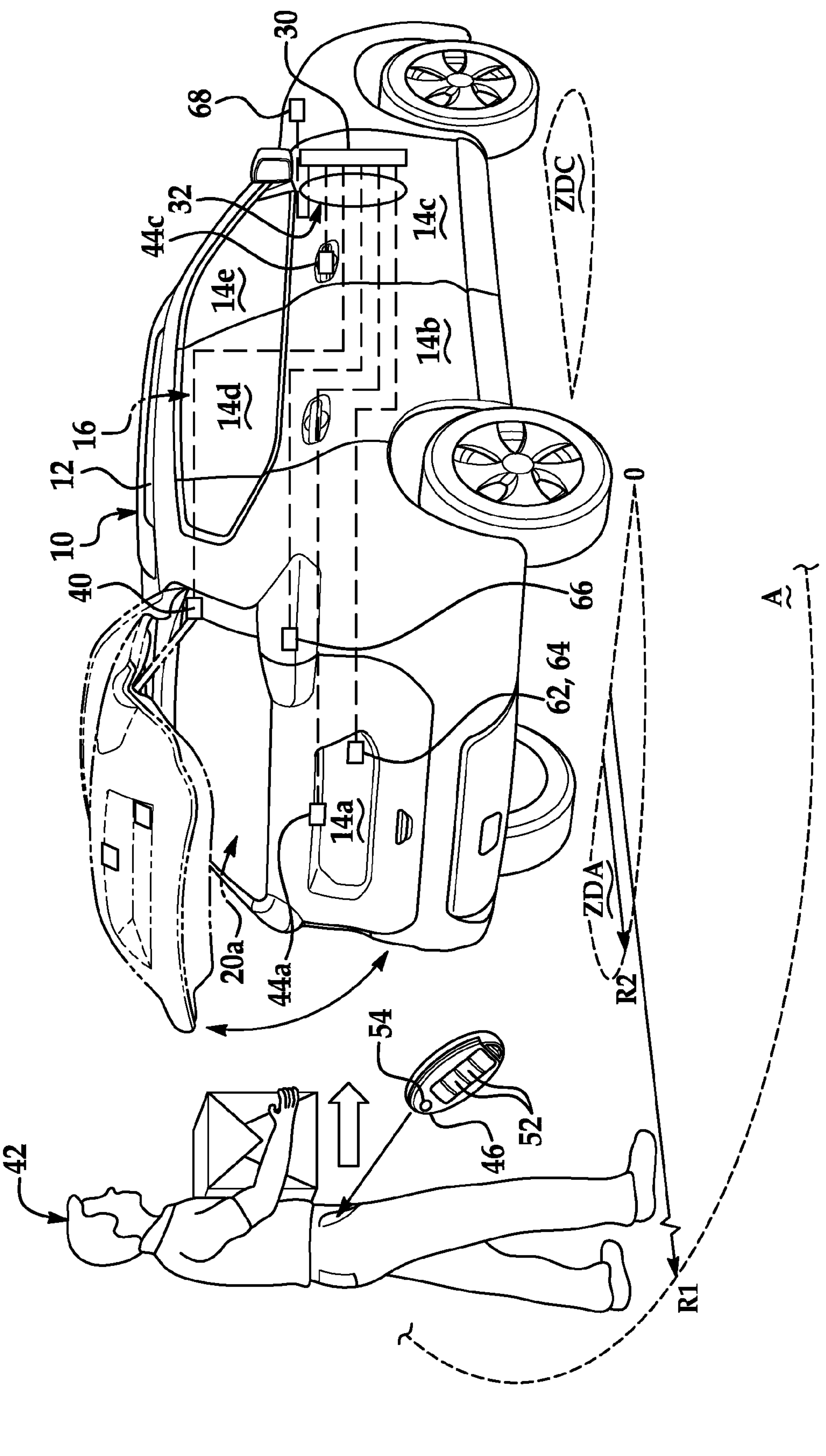
FIGS. 1 and 2 show a remote controller and a vehicle having a power backdoor and system for activating automatic movement of the backdoor in response to the remote controller, with FIG. 1 being a perspective view of the remote controller and the vehicle and showing the backdoor in both a closed position and an open position, and with FIG. 2 being a system view of the remote controller and the vehicle.

A representative vehicle 10 is shown in FIG. 1. The vehicle 10 has a vehicle body structure 12 which, together with a backdoor 14*a*, side doors 14*b* and 14*c* and other vehicle panels, defines an interior 16 of the vehicle 10. The vehicle body structure 12 is at least partially open to define one or more openings, such as an opening 20*a* associated with the backdoor 14*a*, between the interior 16 of the vehicle 10 and an environment outside the vehicle 10.

As shown, the backdoor 14*a* is supported by the vehicle body structure 12 for movement with respect to the remainder of the vehicle 10. In particular, the backdoor 14*a* is supported for upward pivotal movement between a closed position, where the backdoor 14*a* closes the opening 20*a*, and one or more open positions. In an open position, the backdoor 14*a* is moved away from its closed position to expose the opening 20*a* and, for example, permit ingress to and egress from a rear cargo area of the interior 16 of the vehicle 10. The backdoor 14*a* may be configured as a so-called liftgate in accordance with the illustrated non-limiting example of the vehicle 10. For other examples of the vehicle 10, the backdoor 14*a* could alternatively be configured as one or more of a swinging door, a hatch, a trunk lid or a tailgate, for instance.

In addition to the backdoor 14*a*, a number of other closure panels may be directly or indirectly supported by the vehicle body structure 12 for movement between a closed position and one or more open positions. In the illustrated vehicle 10, such closure panels include, for instance, the illustrated side doors 14*b* and 14*c* and respective retractable window panels 14*d* and 14*e*. In the illustrated example of the vehicle 10, the side doors 14*b* and 14*c* are configured as conventional swinging doors. For other examples of the vehicle 10, one or both of the side doors 14*b* and 14*c* could alternatively be configured as a sliding door, for instance.

Example systems and operations for automatically activating a vehicle function are described below with reference to the activation of automatic movement of the backdoor 14*a* of the illustrated example of the vehicle 10. However, it will be understood that the principles of these examples are suited for implementation with other vehicle closure panels. For the illustrated example of the vehicle 10, such closure panels could include the side doors 14*b* and 14*c* and the window panels 14*d* and 14*e*. For other examples of the vehicle 10, such closure panels may include any other type of vehicle panel that is supported directly or indirectly by the vehicle body structure 12 for swinging, slidable, retractable or other movement with respect to the remainder of the vehicle 10 between a closed position and one or more open positions. Moreover, it will be understood that the principles of these examples are suited for implementation in connection with the automatic activation of other vehicle functions, including without limitation activation of locks, lighting, entertainment or infotainment systems, HVAC systems, seat positions or an engine start.

Figure 2:
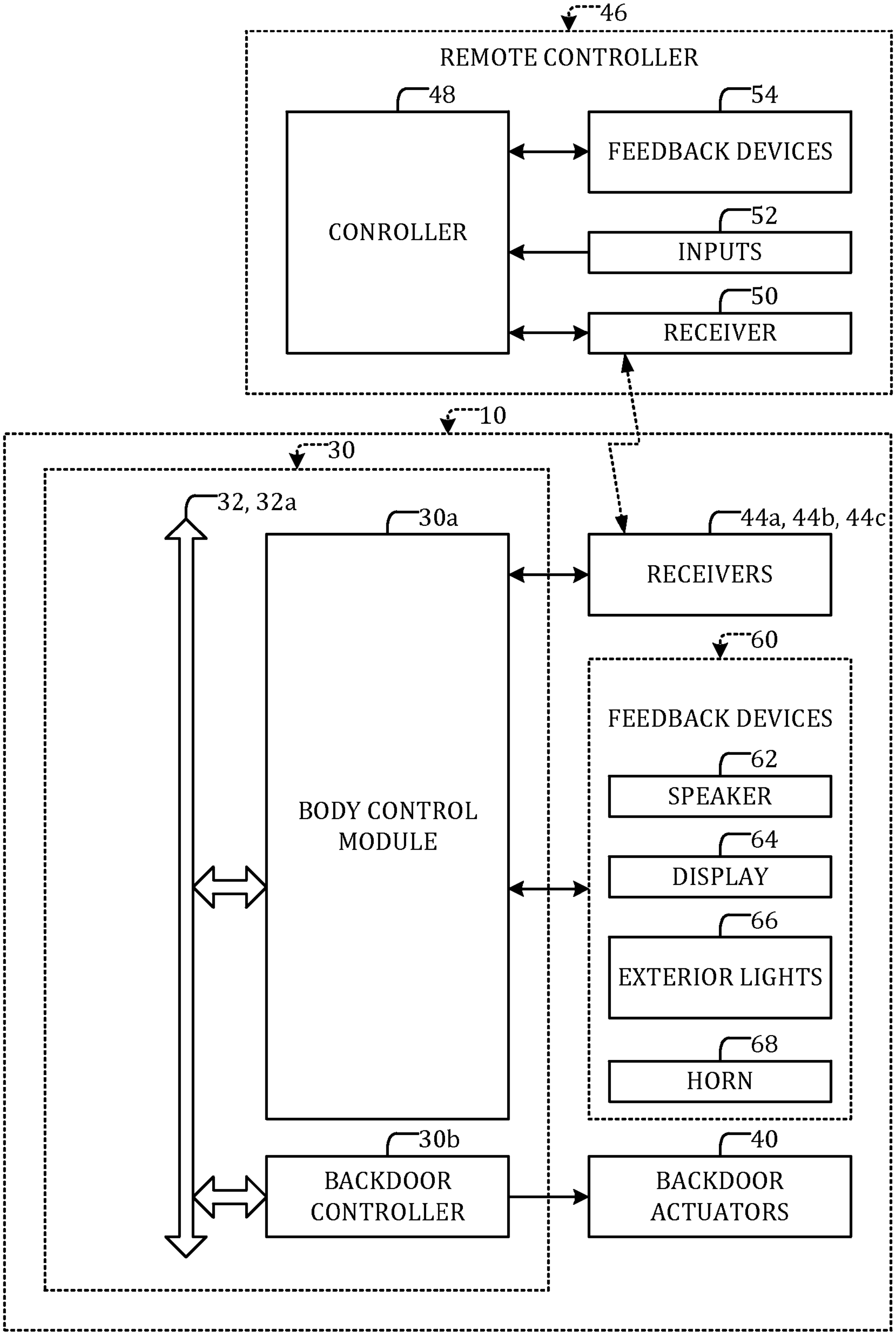

As shown with additional reference to FIG. 2, the vehicle 10 includes at least one vehicle controller 30. The vehicle controller 30 is communicatively coupled with a variety of componentry described in greater detail below over one or more communications channels 32 in order to provide the vehicle controller 30 with information and allow the vehicle controller 30 to control one or more of the electrical and/or electromechanical functions of the vehicle 10. The communication channel 32 may be or include one or more wired or wireless channels, for example, using standard or proprietary protocols.

The vehicle controller 30 may be one or multiple computers including a random access memory (RAM), a read-only memory (ROM) and a central processing unit (CPU) in addition to various input and output connections. Generally, the control functions of the vehicle 10 described herein can be implemented by one or more software programs stored in internal or external memory and are performed by execution by the CPU. However, some or all of the functions could also be implemented by hardware components.

The vehicle controller 30 can be a single controller, or, as indicated in FIG. 2, may include multiple separate controllers. In the example shown in FIG. 2, the controller 30 includes a body control module (BCM) 30*a* and a backdoor controller 30*b*. The BCM 30*a* and the backdoor controller 30*b* and any other controllers can each be a dedicated electronic control unit (ECU) for controlling different functions of the vehicle 10. In this example, as shown, the communications channel 32 may include a controller area network (CAN) bus 32*a* configured to allow for sharing of information, data and/or computing resources between the BCM 30*a* and the backdoor controller 30*b*. It will be understood that references to the control functions of the BCM 30*a* and the backdoor controller 30*b* are provided as non-limiting examples, and that the any of the described control functions can be performed generally by any portion of the vehicle controller 30.

The vehicle 10 is equipped to support automatic powered movement of the backdoor 14*a*. In general, the vehicle 10 can include one or more powered backdoor actuators 40 that are coupled to the backdoor 14*a* and configured to move, under the control of the backdoor controller 30*b*, the backdoor 14*a* between its closed position and one or more open positions.

According to the illustrated example, the vehicle 10 may, for instance, include two motorized linear backdoor actuators 40 (one of the two backdoor actuators 40 is shown in FIG. 1) located at opposing sides of the backdoor 14*a*. In this example, the backdoor actuators 40 are connected between the vehicle body structure 12 and the backdoor 14*a*. The backdoor actuators 40 are arranged such that progressive extension of the backdoor actuators 40 under the control of the backdoor controller 30*b* moves the backdoor 14*a* from the closed position to multiple open positions, until the backdoor 14*a* is fully opened, and such that progressive retraction of the backdoor actuators 40 under the control of the backdoor controller 30*b* moves the backdoor 14*a* from an open position towards, and ultimately to, the closed position. In alternative examples of the vehicle 10, instead of the pair of backdoor actuators 40 located at opposing sides of the backdoor 14*a*, a single backdoor actuator 40 or more than two backdoor actuators 40 could be used in similar or different arrangements. Also, in these or other examples of the vehicle 10, the one or more backdoor actuators 40 could include other types of actuators other than the illustrated linear actuators.

The vehicle 10 is additionally equipped to establish one or more interfaces between the vehicle 10 and a user 42 of the vehicle. For instance, as shown, the vehicle 10 can include one or more receivers configured for wireless communication with a remote controller 46 for the vehicle 10. As shown with additional reference to FIG. 5, the vehicle 10 may include receivers 44*a*, 44*b* and 44*c* respectively located at the backdoor 14*a*, the side door 14*b* and the side door 14*c*.

As a non-limiting example, the remote controller 46 can be, or include, a key fob for the vehicle 10, as shown in FIG. 1. In alternative examples, the remote controller 46 could be, or include, a cell phone or other remote electronic device. It will be understood that although remote controller functions are generally described herein with reference to a single remote controller 46 for clarity, the described functions of the remote controller can be performed collectively using any number of separate remote controllers.

As shown with additional reference to FIG. 2, the remote controller 46 includes at least one controller 48. The controller 48 may be one or multiple computers including a random access memory (RAM), a read-only memory (ROM) and a central processing unit (CPU) in addition to various input and output connections. Generally, the control functions of the remote controller 48 described herein can be implemented by one or more software programs stored in internal or external memory and are performed by execution by the CPU. However, some or all of the functions could also be implemented by hardware components.

The remote controller 46, similarly to the vehicle 10, includes a receiver 50 that supports wireless communication with the vehicle controller 30. In the illustrated example, the receivers 44*a*, 44*b* 44*c* of the vehicle 10, and the receiver 50 of the remote controller 46 can each include an antenna or other device enabling the transmission and receipt of radio signals, for instance. Alternatively, or additionally, the receivers 44*a*, 44*b* 44*c*, and the receiver 50 can each include devices enabling the transmission and receipt of other types of signals, such as infrared signals.

The vehicle 10 and the remote controller 46 of the present disclosure are configured to implement a system in which the user 42, prior to approaching the vehicle 10, can remotely enable a feature whereby the backdoor 14*a* will automatically move from its closed position to an open position when the user 42 approaches the vehicle 10 at some time in the future. The system may be useful to the user 42, for instance, in situations where the user 42 plans on carrying a package or other load to the vehicle 10, as shown in FIG. 1. The system is configured such that the user 42, before picking up the package, can enter a request into the remote controller 46 to have the backdoor 14*a* automatically move from its closed position to an open position when the user 42 approaches the vehicle 10. The user 42 can then secure the remote controller 46 on their person and pick up the package. The request will be communicated to the vehicle 10 and acted on as the user 42 approaches the vehicle 10, without requiring additional action by the user 42 with respect to the remote controller 46.

In support of the functions of the system described below, the remote controller 46 can include one or more inputs 52 that the user 42 can manipulate to enter requests into the remote controller 46 for communication to the vehicle 10. Also, the remote controller 46 can include one or more feedback devices 54. The feedback devices 54 may be any devices for conveying information to the user 42 about the status of requests entered by the user 42. According to the illustrated example, the feedback device 54 can include an LED light or other display for conveying information to the user 42 in a visible format. In other examples, the feedback device may, for instance, include a speaker for conveying information to the user 42 in an audible format, or a haptic feedback module for conveying information to the user 42 in a tactile format. In the illustrated example of the remote controller 46, the feedback devices 54 are in communication with the controller 48 for receiving signals corresponding to the information to be conveyed to the user 42.

The vehicle 10 may also include one or more feedback devices 60. The feedback devices 60 may be any devices for conveying information to the user 42 while the user 42 is located in the general proximity of the backdoor 14*a*. The feedback devices 60 may, for example, be dedicated for use in a system for moving the backdoor 14*a*, and include, for instance, a speaker 62 for conveying information to the user 42 in an audible format, or, an electronic display 64 for conveying information to the user 42 in a visible format. In addition, or alternatively, the functions of the feedback devices 80 may be accomplished with devices already present in the vehicle 10, such exterior lights 66 or horn 68, for example. As shown, the feedback devices 60 are in communication with the vehicle controller 30 for receiving signals corresponding to the information to be conveyed to the user 42.

Figure 3:
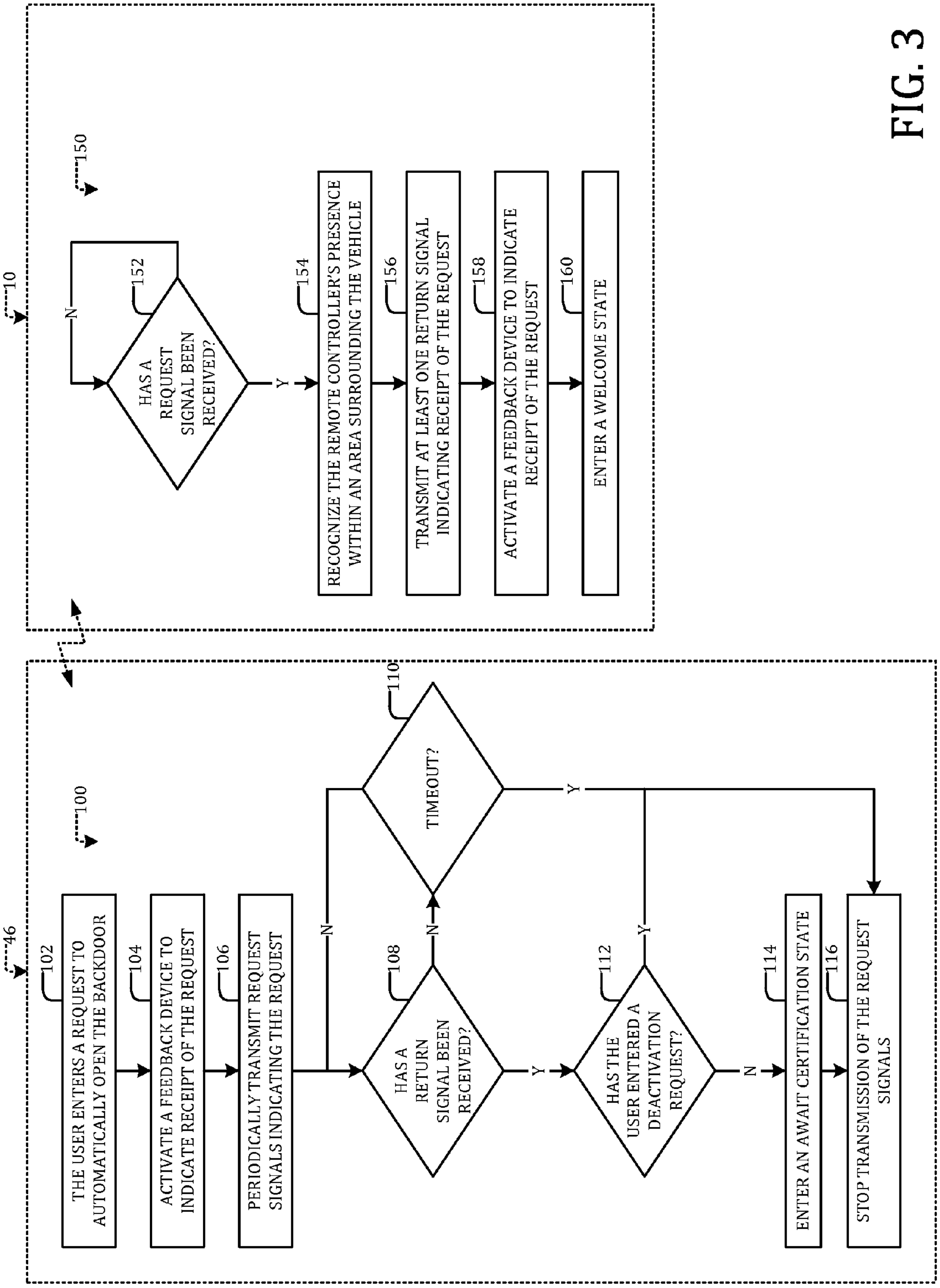
FIGS. 3 and 4 are flow diagrams showing operations for activating automatic movement of the backdoor using the remote controller.
Figure 4:
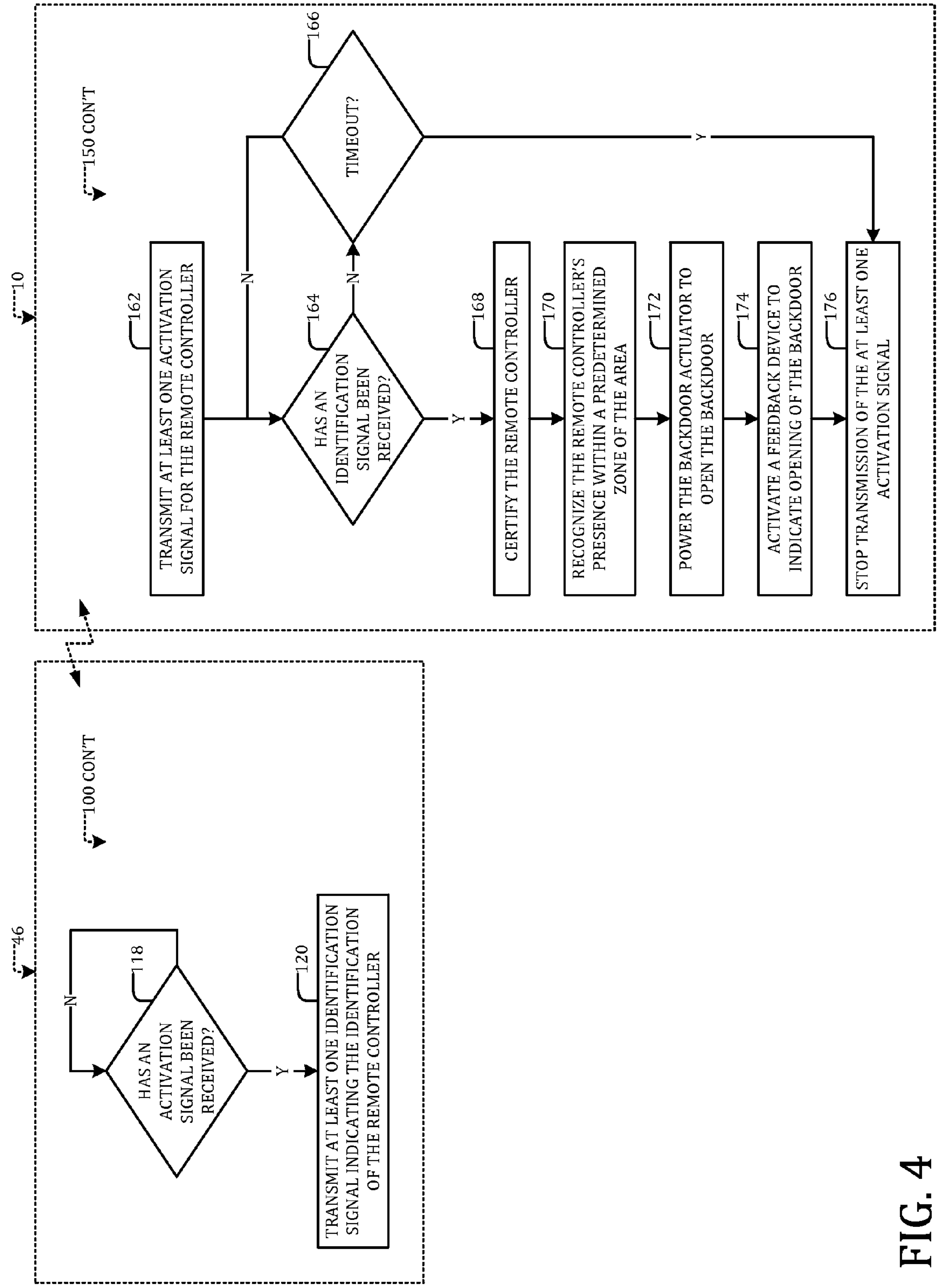
Figure 5:
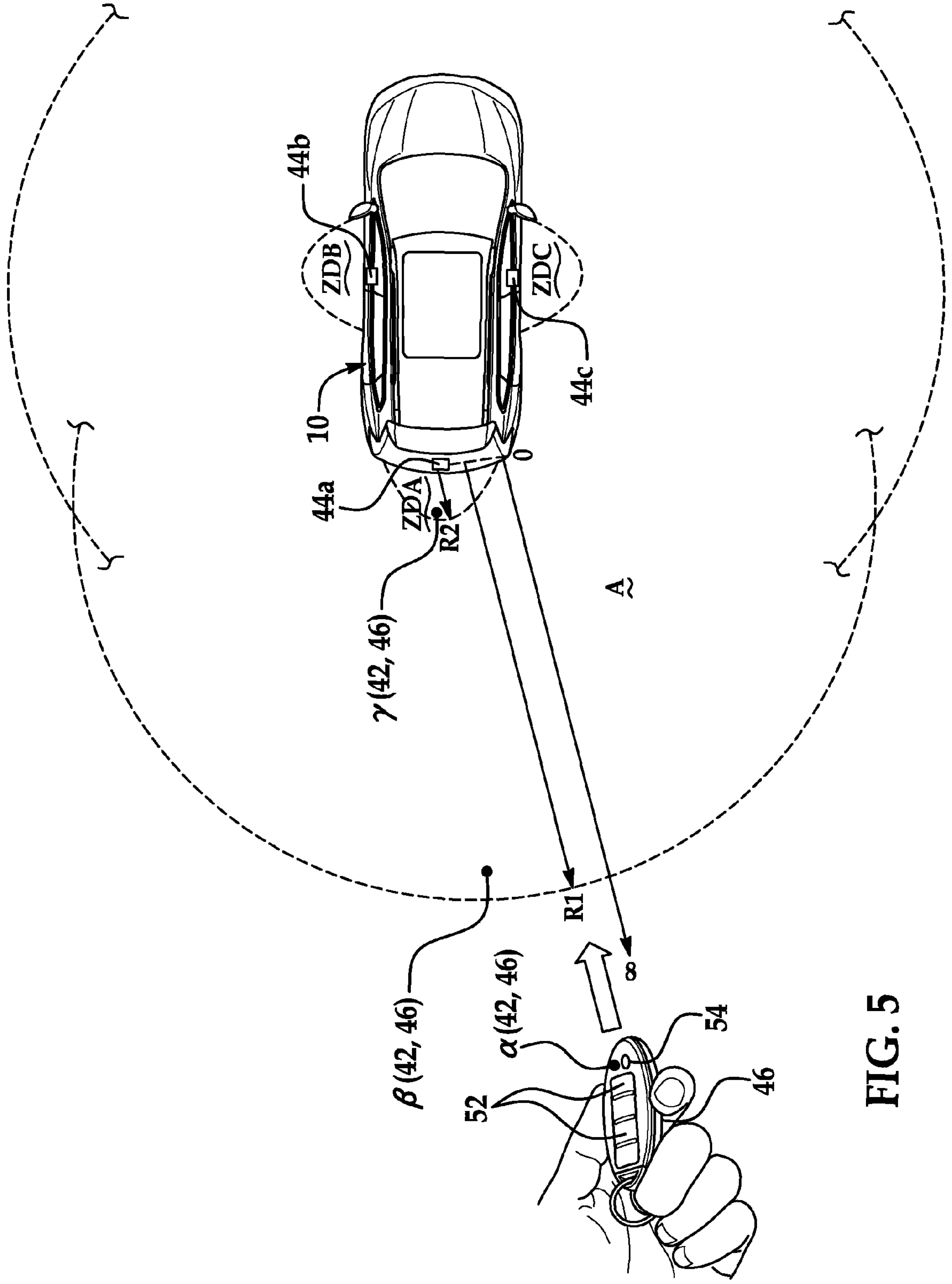
FIG. 5 is a top view of the remote controller and the vehicle showing the location of a user of the vehicle in different situations and referenced in explaining the operations shown in FIGS. 3 and 4.

The operations of parallel processes 100 at the remote controller 46, and 150 at the vehicle 10, are shown in FIGS. 3 and 4 and explained with additional reference to FIG. 5. For purposes of the control by the vehicle 10 in connection with the remote controller 46, it is assumed that the user 42 carries the remote controller 46 on their person, and therefore, that the location of the remote controller 46 can serve as a general proxy for the location of the user 42.

As shown in FIG. 3, the process 100 is implemented at the remote controller 46, and is initiated by operation 102 when the user 42 enters a request into the remote controller 46 to have the backdoor 14*a* automatically open (that is, move from its closed position to an open position) when the user 42 approaches the vehicle 10 at some time in the future. The user 42 can enter the request to automatically open the backdoor 14*a* by manipulating one or more of the inputs 48 of the remote controller 46. The remote controller 46 may include one or more dedicated inputs 48 that can be manipulated by the user 42 to enter the request, for example, or, the remote controller 46 could be configured to recognize the entry of the request from the user 42 upon the manipulation of a plurality of other inputs 48 in unison, in a predetermined sequence, or both.

When the remote controller 46 receives the request from the user 42 to automatically open the backdoor 14*a*, in operation 104, the remote controller 46 can indicate its receipt of the request. In particular, for the example remote controller 46, the controller 48 will generate one or more signals to activate the feedback devices 54 to convey to the user 42 that the request to automatically open the backdoor 14*a* was successfully entered into the remote controller 46. In examples of the remote controller 46 where the feedback devices 54 include an LED light or similar device, the indication can be implicit within the context of the request from the user 42 to automatically open the backdoor 14*a*. In these examples, the indication could be a continuous output of light or one or more light flashes, for instance. In other examples of the remote controller 46, the indication could be, for instance, actuation of a speaker to emit a beep or other noise, or actuation of a haptic feedback device. It will also be understood that a feedback device 54 could be configured to convey an explicit indication that the request was successfully entered.

Further, in operation 106, the remote controller 46 will begin transmission of request signals that indicate the request from the user 42 to automatically open the backdoor 14*a*. As shown in FIGS. 1 and 5, an area A surrounding the vehicle 10 may be defined by an effective communication range R1 between the vehicle 10 and the remote controller 46 for the communication of the request signals. For the illustrated vehicle 10, as indicated, the area A is defined collectively by the effective communication ranges R1 between the receivers 44*a*, 44*b* and 44*c* of the vehicle 10 and the receiver 50 of the remote controller 46 (in the drawings, only one effective communication range R1 is specifically shown in connection with the receiver 44*a*). In one configuration, the request signals can each be a radio frequency (RF) signal, with the effective communication range R1 between a receiver 44*a*, 44*b* or 44*c* and the receiver 50 being approximately sixty meters. In this configuration, the area A surrounding the vehicle 10 is generally defined as being approximately sixty meters in all directions surrounding each of the receivers 44*a*, 44*b* and 44*c*. It will be understood that the above configuration is described as a non-limiting example. In alternative configurations, a different quantity of receivers than the receivers 44*a*, 44*b* and 44*c* of the vehicle 10 could be provided. In addition, other types of signals, and optionally, different effective communication ranges, may be used.

As noted above, the system is adapted such that the user 42 can enter the request to automatically open the backdoor 14*a* from a location remote from the vehicle 10. An example initial location α for the user 42, where the user 42 is located at a remote location outside of the area A surrounding the vehicle 10, is shown in FIG. 5. With the user 42 in the location θ for the user 42, it will be understood that the remote controller 46 is beyond the effective communication range R1 between the vehicle 10 and the remote controller 46 for the communication of the request signals. A request signal will therefore not initially be communicated to the vehicle 10.

However, according to operation 106, the remote controller 46 will periodically transmit the request signals, in anticipation that the user 42, after entering the request to automatically open the backdoor 14*a*, will venture towards the vehicle 10. In one example, the periodic transmission of the request signals could be performed through the transmission of multiple discrete request signals according to a timed sequence. Alternatively, it will be understood that the periodic transmission of the request signals could be inclusive, for instance, of the continuous transmission of a single request signal over a predetermined period of time. That is, in this alternative, the transmission of a request signal will occur at multiple successive points in time.

Meanwhile, in the process 150 implemented at the vehicle 10, the vehicle 10 awaits receipt of a request signal in operation 152. With the user 42 in the location α for the user 42 or in a similar location outside of the area A surrounding the vehicle 10, the vehicle 10 will not receive a request signal, and will not take any action. However, eventually, as the user 42 approaches the vehicle 10, the user 42 will be located within the area A surrounding the vehicle. An example location β for the user 42 is shown in FIG. 5 where the user 42 is located within the area A. With the user 42 in the location α for the user 42, the remote controller 46 will be within the effective communication range R1 between the vehicle 10 and the remote controller 46 for the communication of the request signals, and at least one of the request signals periodically transmitted from the remote controller 46 will be communicated to the vehicle 10. Based on its receipt of at least one of the request signals to the user 42, the vehicle 10 can recognize the presence of the remote controller 46 within the area A in operation 154.

In operation 156, the vehicle 10 transmits at least one return signal indicating receipt by the vehicle 10 of at least one of the request signals for communication to the remote controller 46. In addition, in operation 158, the vehicle 10 can indicate its receipt of at least one of the request signals to the user 42. In particular, for the example vehicle 10, the BCM 30*a* will generate one or more signals to activate one or more of the feedback devices 60 to convey to the user 42 an acknowledgment that the request from the user 42 to automatically open the backdoor 14*a* has been recognized. In examples of the vehicle 10 where the feedback devices 60 include the speaker 62, the electronic display 64 or similar devices, the acknowledgment to the user 42 can be explicit. However, in examples of the vehicle 10 where the feedback devices 60 include devices such as an already present horn exterior light 66 or horn 68, the acknowledgment to the user 42 can be implicit within the context of the request from the user 42 to automatically open the backdoor 14*a*. For instance, the acknowledgment could be a light flash or a horn chirp.

In the illustrated example of the process 150, following operation 158, the vehicle 10 enters a welcome state in operation 160 where the vehicle 10 waits for the presence of the remote controller 46 within a predetermined zone of the area A surrounding the vehicle 10 for permitting automatic movement the backdoor 14*a* from the closed position to an open position in accordance with the request from the user 42. Alternatively, once the vehicle 10 receives at least one of the request signals and recognizes the presence of the remote controller 46 within the area A, the vehicle 10 could automatically move the backdoor 14*a* from the closed position to an open position, in accordance with the request from the user 42, as described below with reference to operation 172.

In the process 100, the remote controller 46 awaits receipt of a return signal in operation 108. To conserve energy resources in the remote controller 46, the process 100 may implement a timeout function at operation 110 in which the process 100 ends in operation 116 after failing to receive a return signal for a predetermined period of time. The process 100 may similarly end in operation 116 if, as shown in operation 112, the user 42 enters a request into the remote controller 46 to have the request to automatically open the backdoor 14*a* deactivated. The user 42 can enter a deactivation request, for instance, by manipulating one or more of the inputs 48 of the remote controller 46. When the remote controller 46 receives a deactivation request, it will be understood that the remote controller 46 can optionally indicate its receipt of the deactivation request either implicitly or explicitly using the feedback devices 54 in a similar manner as that described above.

If the remote controller 46 receives a return signal in operation 108 and fails to identify a deactivation request in operation 112, in operation 114, the remote controller 46 enters an await certification state where it awaits certification by the vehicle 10 in connection with operation 160 in the process 150 implemented at the vehicle 10. In addition, in operation 116, the remote controller 46 stops its transmission of the request signals. In the alternative example of the vehicle 10 where the vehicle 10 automatically moves the backdoor 14*a* in accordance with the request from the user 42 once the vehicle 10 receives at least one of the request signals and recognizes the presence of the remote controller 46 within the area A surrounding the vehicle 10, the remote controller 46 could alternatively proceed directly to operation 116 following operation 112.

In general, as a prerequisite to activating automatic movement of the backdoor 14*a* in response to the request from the user 42, the vehicle 10 may require a positive recognition that the user 42 is located within a predetermined zone of the area A for permitting movement of the backdoor 14*a* in accordance with the request. The predetermined zone may be defined in whole or in part for consistency with prescribed vehicle usage parameters in connection with the requested movement of the backdoor 14*a*. The predetermined zone, in the non-limiting examples discussed below, may be inclusive of one or more detection zones ZDA, ZDB and ZDC for the remote controller 46.

The detection zone ZDA, as shown in FIGS. 1 and 5, is a zone in the area A surrounding the vehicle 10 in the general proximity of the backdoor 14*a*. In particular, the detection zone ZDA is adjacent to the backdoor 14*a* and extends from the backdoor 14*a* into the area A. The detection zone ZDB is similarly adjacent to the side door 14*b*, and the detection zone ZDC is similarly adjacent to an opposing side door.

The vehicle 10 can recognize the presence of the remote controller 46 in the detection zones ZDA, ZDB or ZDC in a number of manners. In one example, the vehicle 10 can recognize the presence of the remote controller 46 in a detection zone ZDA, ZDB or ZDC as a part of a certification process for the remote controller 46.

According to the certification process described below, the vehicle 10 and the remote controller 46 can exchange one or more detection signals. For the illustrated example shown in FIG. 4, in the process 150, one or more of the receivers 44*a*, 44*b* or 44*c* of the vehicle 10 can each transmit one or more activation signals for the remote controller 46 into the area A surrounding the vehicle 10. In the process 100, the remote controller 46 awaits receipt of an activation signal in operation 118. When the remote controller 46 receives an activation signal, in operation 120, the remote controller 46 transmits at least one identification signal indicating an identification specific to the remote controller 46. At the vehicle 10, if one or more transmitted identification signals are received by a receiver 44*a*, 44*b* or 44*c*, assuming that the identification signals indicate that the identification of the remote controller 46 is a match for the vehicle 10, the vehicle 10 will certify the remote controller 46 as being correct for the vehicle 10 in operation 168 of the process 150. As shown, the process 150 may implement a timeout function at operation 166 in which the process 150 ends in operation 176 after failing to receive an identification signal for a predetermined period of time.

In this example, the vehicle 10 and the remote controller 46 can be configured such that the certification of the remote controller 46 by the vehicle 10 supports recognition that the user 42 is located in a detection zone ZDA, ZDB or ZDC for the remote controller 46. As shown in FIGS. 1 and 5, with the receiver 44*a* being located at the backdoor 14*a*, the detection zone ZDA may be defined within the area A surrounding the vehicle 10 by an effective communication range R2 between the receiver 44*a* of the vehicle 10 and the receiver 50 of the remote controller 46 for the communication of one or more detection signals (that is, according to the example described above, the activation signals and/or the identification signals). The detection zones ZDB and ZDC may be defined by similar effective communication ranges (in the drawings, only one effective communication range R2 is specifically shown in connection with the receiver 44*a* of the vehicle 10), respectively, between the receivers 44*b* and 44*c* of the vehicle 10 and the remote controller 46 for the communication of one or more detection signals. In one configuration, the one or more detection signals can each be a low frequency (LF) radio signal, with effective communication ranges R2 between the respective receiver 44*a*, 44*b* or 44*c* and the receiver 50 being approximately one meter. In this configuration, the detection zones ZDA, ZDB and ZDC are generally defined as being approximately one meter in all directions surrounding the respective receivers 44*a*, 44*b* and 44*c*. It will be understood that the above configuration is described as a non-limiting example. In alternative configurations, a different quantity of receivers than the receivers 44*a*, 44*b* and 44*c* of the vehicle 10 could be provided. In addition, other types of signals, and optionally, different effective communication ranges, may be used.

The predetermined zone of the area A for permitting movement of the backdoor 14*a* in accordance with the request from the user 42 can be defined in whole or in part with reference to the detection zones ZDA, ZDB and ZDC, either alone or in combination with attributes of the request from the user 42 to automatically open the backdoor 14*a*. In furtherance of the example where the request from the user 42 is to automatically open the backdoor 14*a*, the predetermined zone of the area A can be the detection zone ZDA. An example location γ for the user 42 where the user 42 is located within the detection zone ZDA is shown in FIG. 5. According to this example, with the user 42 in the location γ for the user 42, the remote controller 46 will be within the effective communication range R2 between the receiver 44*a* of the vehicle 10 and the receiver 50 of the remote controller 46 for the exchange of the detection signals, which supports the recognition in operation 170 of the presence of the remote controller within the predetermined zone.

It will be understood that the example where the request from the user 42 is to automatically open the backdoor 14*a*, and where the predetermined zone of the area A for permitting movement of the backdoor 14*a* in accordance with the request is the detection zone ZDA, is provided as a non-limiting example. In another example, the request from the user 42 could be to automatically open the backdoor 14*a*, and the predetermined zone of the area A could be any of the detection zones ZDA, ZDB or ZDB. In yet another example, the request from the user 42 could be a generic request to automatically open any one of the backdoor 14*a*, the side door 14*b* or the side door 14*c*, and the predetermined zone of the area A could be any of the detection zones ZDA, ZDB or ZDB. In this example, following recognition in operation 170 of the presence of the remote controller within a detection zone ZDA, ZDB or ZDB, the process 150 could proceed such that the corresponding adjacent backdoor 14*a*, side door 14*b* or side door 14*c* is automatically opened.

In operation 172, the vehicle 10 automatically moves the backdoor 14*a*, in accordance with the request from the user 42, from the closed position to an open position. In particular, for the example vehicle 10, the BCM 30*a* will generate one or more signals to actuate the backdoor actuators 40 in order to move the backdoor 14*a* from the closed position to an open position. In operation 174, the vehicle 10 can indicate the opening of the backdoor 14*a* either implicitly or explicitly to the user 42 using the feedback devices 60 in a similar manner as that described above. In addition, in operation 176, the remote controller 46 stops its transmission of the activation signals.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for activating a vehicle function, comprising:

a remote controller, the remote controller configured to:

receive, prior to a user approaching an associated vehicle, a request from the user to have a vehicle function activated when the user approaches the associated vehicle, and transmit request signals indicating the request at predetermined intervals of time from receipt of the request from the user until at least a first request signal is received by a vehicle controller; and a first communication range defined around the vehicle controller in which the vehicle controller is capable of receiving the request signals from the remote controller, wherein the request from the user is made outside of the first communication range, the vehicle controller configured to generate an instruction to activate the vehicle function in accordance with the request when at least the first request signal is received by the vehicle controller.

2. The system of claim 1, wherein the vehicle controller defines a second communication range with the at least one remote controller for communication of detection signals, and the vehicle controller is further configured to:

transmit one or more detection signals to the remote controller, the transmission indicating receipt of at least the first request signal from the remote controller when the remote controller enters the second communication range, and the remote controller is further configured to cease transmission of the request signals when the transmission indicating receipt by the vehicle controller is received.

3. The system of claim 2, wherein the second communication range corresponds to a predetermined zone within the first communication range for permitting activation of the vehicle function in accordance with the request.

4. The system of claim 2, wherein at least one of the one or more detection signals are low frequency radio signals.

5. The system of claim 2, wherein the second communication range is approximately one meter.

6. The system of claim 1, wherein the remote controller is further configured to continue to transmit the request signals at the predetermined intervals upon receiving the request, without receiving an additional request from the user when the user approaches their vehicle at a future time.

7. The system of claim 1, wherein the vehicle further includes at least one user feedback device, and the vehicle controller is further configured to:

control the user feedback device to indicate its receipt of at least one of the request signals.

8. The system of claim 1, wherein the request signals are radio frequency signals, and the first communication range is approximately sixty meters.

9. The system of claim 1, wherein the first communication range is approximately sixty meters.

10. The system of claim 1, wherein the vehicle further includes a moveable closure panel, and the vehicle function is movement of a position of the closure panel from a closed position to an open position.

11. A vehicle, comprising:

a remote controller configured to receive a request from the user to have a vehicle function activated when the user approaches the vehicle;

a receiver, the receiver defining a first communication range and a second communication range with the remote controller, the first communication range being larger than the second communication range, the remote controller further configured to transmit request signals indicating the request at predetermined intervals of time from receipt of the request from the user made outside of the first communication range; and a system for activating the vehicle function, the system configured to:

upon entry of the remote controller into the first communication range, receive one or more vehicle function activation request signals from the remote controller over the first communication range while the remote controller is outside of the second communication range, enter a welcome state for the remote controller, exchange one or more detection signals with the remote controller over the second communication range, and generate an instruction to activate the vehicle function based on the receipt of the one or more vehicle function activation request signals and the exchange of the one or more detection signals.

12. The vehicle of claim 11, wherein the second communication range corresponds to a predetermined zone within the first communication range for permitting activation of the vehicle function.

13. The vehicle of claim 11, wherein the system is further configured to transmit one or more return signals indicating its receipt of the one or more vehicle function activation request signals.

14. The vehicle of claim 11, further comprising:

at least one user feedback device, wherein the system is further configured to:

generate an instruction to activate the user feedback device to indicate its receipt of the one or more vehicle function activation request signals.

15. The vehicle of claim 11, wherein the one or more vehicle function activation request signals are radio frequency signals.

16. The vehicle of claim 11, wherein the first communication range is approximately sixty meters.

17. The vehicle of claim 11, wherein at least one of the one or more detection signals are low frequency radio signals.

18. The vehicle of claim 11, wherein the second communication range is approximately one meter.

19. The vehicle of claim 11, further comprising:

a moveable closure panel, wherein the vehicle function is movement of a position of the closure panel from a closed position to an open position.

* * * * *